US007918735B2

(12) United States Patent
Inamura

(10) Patent No.: US 7,918,735 B2
(45) Date of Patent: Apr. 5, 2011

(54) GAMING SYSTEM AND GAMING MACHINE

(75) Inventor: Yukinori Inamura, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1073 days.

(21) Appl. No.: 11/283,920

(22) Filed: Nov. 22, 2005

(65) Prior Publication Data

US 2006/0111179 A1 May 25, 2006

(30) Foreign Application Priority Data

Nov. 25, 2004 (JP) ................................. 2004-341055

(51) Int. Cl.
*A63F 13/00* (2006.01)

(52) U.S. Cl. ................ 463/42; 463/25; 463/30; 463/31; 463/40; 273/139

(58) Field of Classification Search .................... 463/25, 463/30, 31, 37, 40, 42; 273/139
See application file for complete search history.

(56) References Cited

U.S. PATENT DOCUMENTS

| | | | | |
|---|---|---|---|---|
| 4,335,809 | A | 6/1982 | Wain | |
| 4,856,787 | A | 8/1989 | Itkis | |
| 5,277,424 | A * | 1/1994 | Wilms | 463/12 |
| 5,993,316 | A * | 11/1999 | Coyle et al. | 463/25 |
| 6,068,552 | A * | 5/2000 | Walker et al. | 463/21 |
| 6,506,116 | B1 | 1/2003 | Sunaga et al. | |
| 7,465,231 | B2 * | 12/2008 | Lewin et al. | 463/37 |
| 2002/0142846 | A1 * | 10/2002 | Paulsen | 463/43 |
| 2002/0151366 | A1 * | 10/2002 | Walker et al. | 463/42 |
| 2002/0152120 | A1 * | 10/2002 | Howington | 705/14 |
| 2003/0064771 | A1 | 4/2003 | Morrow et al. | |
| 2003/0195031 | A1 * | 10/2003 | O'Donovan et al. | 463/16 |
| 2003/0216182 | A1 * | 11/2003 | Gauselmann | 463/40 |
| 2004/0084844 | A1 | 5/2004 | Adams | |

FOREIGN PATENT DOCUMENTS

| | | | |
|---|---|---|---|
| EP | 0 588 625 | A1 | 3/1994 |
| EP | 1 231 577 | A2 | 8/2002 |
| EP | 1 363 252 | A2 | 11/2003 |
| RU | 26011 | | 11/2002 |
| WO | WO 01/99067 | A2 | 12/2001 |
| WO | WO 03/069497 | A1 | 8/2003 |

* cited by examiner

*Primary Examiner* — James S McClellan
(74) *Attorney, Agent, or Firm* — Oblon, Spivak, McClelland, Maier & Neustadt, L.L.P.

(57) ABSTRACT

A plurality of game selection-enabled gaming machines, which implement a game on the basis of a unit gaming fee, are connected to a game providing server via a network. The game providing server includes a game program storage unit and a download unit for permitting downloading a game program of a type of game requested by the gaming machine. The respective gaming machines includes a unit gaming fee selection unit for enabling selection of a unit gaming fee from a plurality of candidates, a game type selection unit for enabling selection of a type of game from the game type candidates which accept the selected unit gaming fee, and a game program request unit for requesting the game program from the game providing server.

7 Claims, 15 Drawing Sheets

FIG. 15

| | HYBRID GAME 1 | HYBRID GAME 2 | VIDEO GAME 1 | .... | POKER GAME 1 | POKER GAME 2 |
|---|---|---|---|---|---|---|
| ¢1 | ○ | | | .... | | |
| ¢5 | ○ | ○ | | .... | ○ | |
| ¢10 | | ○ | ○ | .... | ○ | |
| ⋮ | ⋮ | ⋮ | ⋮ | ⋮ | ⋮ | ⋮ |
| $10 | | | | .... | | ○ |

GAMING SYSTEM AND GAMING MACHINE

RELATED APPLICATIONS

This application claims the priority of Japanese Patent Application No. 2004-341055 filed on Nov. 25, 2004, which is incorporated by reference.

BACKGROUND OF THE INVENTION

1. Field of the Invention

The present invention relates to a gaming system and a gaming machine, and may be applied, for example, to a gaming machine in which a plurality of denominations of money can be used as a unit gaming fee, and to a gaming system which includes a gaming machine of this kind as a constituent element.

2. Description of the Prior Art

There are gaming machines in casinos, or the like, which have different unit gaming fees, the unit gaming fee being the smallest unit of the payment for playing one round of a game, and which also forms a reference for deciding the award amount in the event of a winning game result. The plurality of unit gaming fees (which may also be called "denominations") are based on different denominations of money, such as 1 cent, 25 cent, 1 dollar, and the like. In a casino or the like, in general, gaming machines which use the same denomination of money for the unit gaming fee are installed in the same fixed area. Therefore, if a player wishes to play a game using a different denomination, then he or she must move to a different area. This movement of the player causes a decline in the operating rate of the gaming machines.

In view of this point, in the prior art, gaming machines have been introduced which allow one of a plurality of different unit gaming fees to be set in the same gaming machine (see U.S. Pat. No. 6,506,116).

However, in a gaming machine in which the unit gaming fee can be set, although the player is able to select the unit gaming fee, the game that he or she plays is the same. Therefore, a gaming machine offering an unpopular game will have a low operating rate, even if it is provided with a function for changing the unit gaming fee, and this is a significant problem from the viewpoint of the operator of the game arcade where the gaming machine is located.

SUMMARY OF THE INVENTION

An object of the present invention is to provide a gaming system and a gaming machine whereby the operating rate of a gaming machine can be raised by being able to respond flexibly to the wishes of the player with respect to the type of game, and the like.

In order to achieve the aforementioned object, the present invention provides a gaming system in which a plurality of game selection-enabled gaming machines, which implement a game on the basis of a unit gaming fee, are connected to a game providing server, via a network; wherein (1) the game providing server comprises: memory (game program storage means) for storing a plurality of types of games; and processor (download means) for permitting downloading a game program of a type of game requested by any of the game selection-enabled gaming machines; and wherein (2) each of the gaming machines comprises: unit gaming fee selector (unit gaming fee selection means) for enabling selection of a unit gaming fee from a plurality of unit gaming fee candidates; game type selector (game type selection means) for enabling section of a type of game from one or more game type candidates which accept the selected unit gaming fee; and processor (game program request means) for requesting a game program of the selected type of game, from the game providing server.

Further, the invention provides the gaming system, wherein the game providing server further comprises determination means for determining whether or not conditions for permitting downloading are satisfied, when a game program of a certain game type is requested by any of the game selection-enabled gaming machines.

The invention also provides the gaming system, wherein the determination means is configured to determine that downloading is not permitted in cases where if the current request is accepted and the game program is downloaded then a total number of gaming machines that downloaded the game program is equal to or greater than a threshold value, or is configured to determine that downloading is not permitted in cases where a ratio of the total number of gaming machines that downloaded the game program to a total number of said plurality of gaming machines is equal to or greater than a threshold value.

Further, the invention provides the gaming system, wherein each of the gaming machines comprises display means; and wherein game type selection means includes touch panel switches configured to change the type of game displayed on the display means.

In addition, the invention provides the gaming system, wherein each of the gaming machines comprises display means configured to display a gaming demonstration screen thereon during a changing of the type of game.

Still further, the invention provides the gaming system, wherein each of the gaming machines comprises display means, and wherein the unit gaming fee selection means includes touch panel switches configured to select the unit gaming fee displayed on the display means.

The invention may also provide the gaming system, wherein the network is any one of: a local area network, a public telecommunication network, a dedicated circuit in which the game providing server and the gaming machines are connected in a one-to-one fashion, and a radio circuit configured to provide radio communications between the game providing server and the gaming machines.

The invention provides a game selection-enabled gaming machine that implements a game on the basis of a unit gaming fee, comprising: unit gaming fee selector (unit gaming fee selection means) for enabling selection of a unit gaming fee from a plurality of unit gaming fee candidates; and game type selector (game type selection means) for enabling selection of a type of game from one or more game type candidates that accept the selected unit gaming fee.

Further, the invention provides the gaming machine further comprising game program request means for requesting a game program of the selected type of game from a game providing server connected via a network.

Still further, the invention provides the gaming machine further comprising game program storage means for storing game programs of a plurality of types of games; and game program extraction means for extracting a game program of the selected type of game from the game program storage means, and setting the extracted game program in a storage region for execution of a game.

The gaming machine of the invention further comprises display means; wherein the game type selection means includes touch panel switches configured to change the type of game displayed on the display means.

Further, the gaming machine of the invention comprises display means configured to display a gaming demonstration screen thereon during a changing of the type of game.

Still further, the gaming machine of the invention comprises display means, wherein the unit gaming fee selection means includes touch panel switches configured to enable selection of the unit gaming fee displayed on the display means.

BRIEF DESCRIPTION OF THE DRAWINGS

FIG. 15 is an illustrative diagram showing the relationship between game types and unit gaming fees according to an embodiment of the present invention.

DESCRIPTION OF THE PREFERRED EMBODIMENTS

(A) First Embodiment

Below, one preferred embodiment of a gaming system and gaming machine according to the present invention is described with reference to the drawings.

(General Composition of Gaming System)

Figure 1:
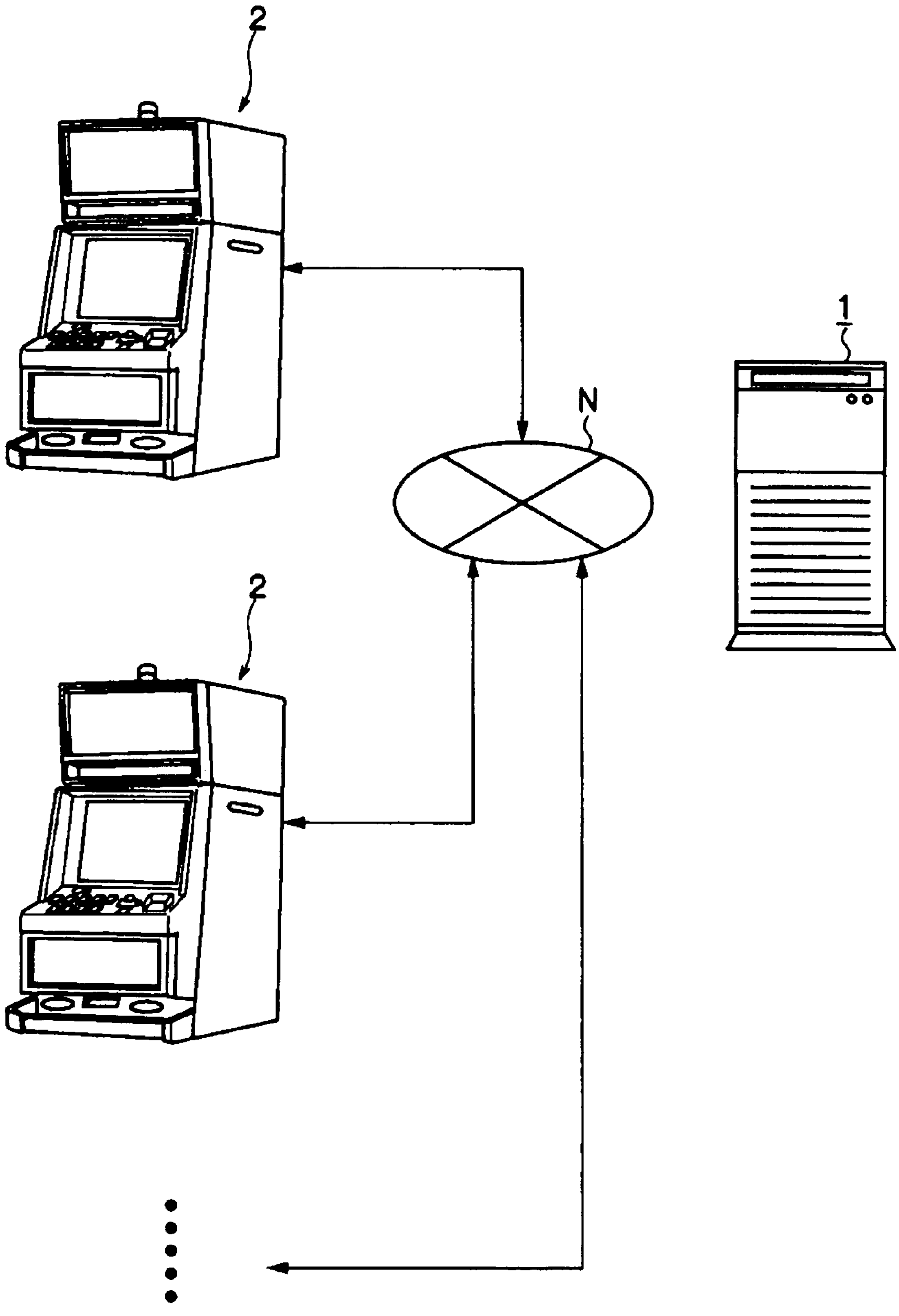
FIG. 1 is a schematic diagram showing the composition of network connections in a gaming system according to an embodiment of the present invention.

FIG. 1 is a schematic drawing of the general composition of a gaming system according to this embodiment.

In FIG. 1, in the gaming system according to this embodiment, a game providing server 1 is connected to a plurality of game selection-enabled gaming machines 2 (gaming machines 2 capable of selecting a game), via a network N.

Here, the network N may be designed as a bus, ring, mesh, or daisy chain network, or a combination of these, provided that the adopted design allows the game providing server 1 to perform data communications independently with the respective game selection-enabled gaming machines 2 (this may also be satisfied by a simultaneous broadcasting function). As well as using a LAN, for example, as the network N, it is also possible to use a public telecommunication network. Although it does not come within the concept of the term "network" in the strict sense, the network N in FIG. 1 is also taken to represent a situation where the game providing server 1 and the respective game selection-enabled gaming machines 2 are connected on a one-to-one basis by means of dedicated circuits. Furthermore, the game providing server 1 and the game selection-enabled gaming machines 2 may also be connected by radio communications, and a radio circuit of this kind is also included in the concept of the network N shown in FIG. 1.

The game providing server 1 according to the present embodiment is situated in the control center of a casino, or the like, for example, and principally, it comprises a game providing function for supplying, to the game selection-enabled gaming machines 2, game programs required in order that the game selection-enabled gaming machines 2 can operate as gaming machines which execute a game of a game type selected by the player, and a gaming machine managing function for managing the game status, such as the sales made at the game selection-enabled gaming machines 2, payouts of an award, and the like.

Here, a game program is a complete set of the commands and data for executing a game, such as the data relating to the effect images, commands or data specifying the "storyline", and the like.

A server supplying the aforementioned game providing function and a server supplying the aforementioned gaming machine management function may also be provided separately.

(Composition of Game Providing Server)

Figure 2:
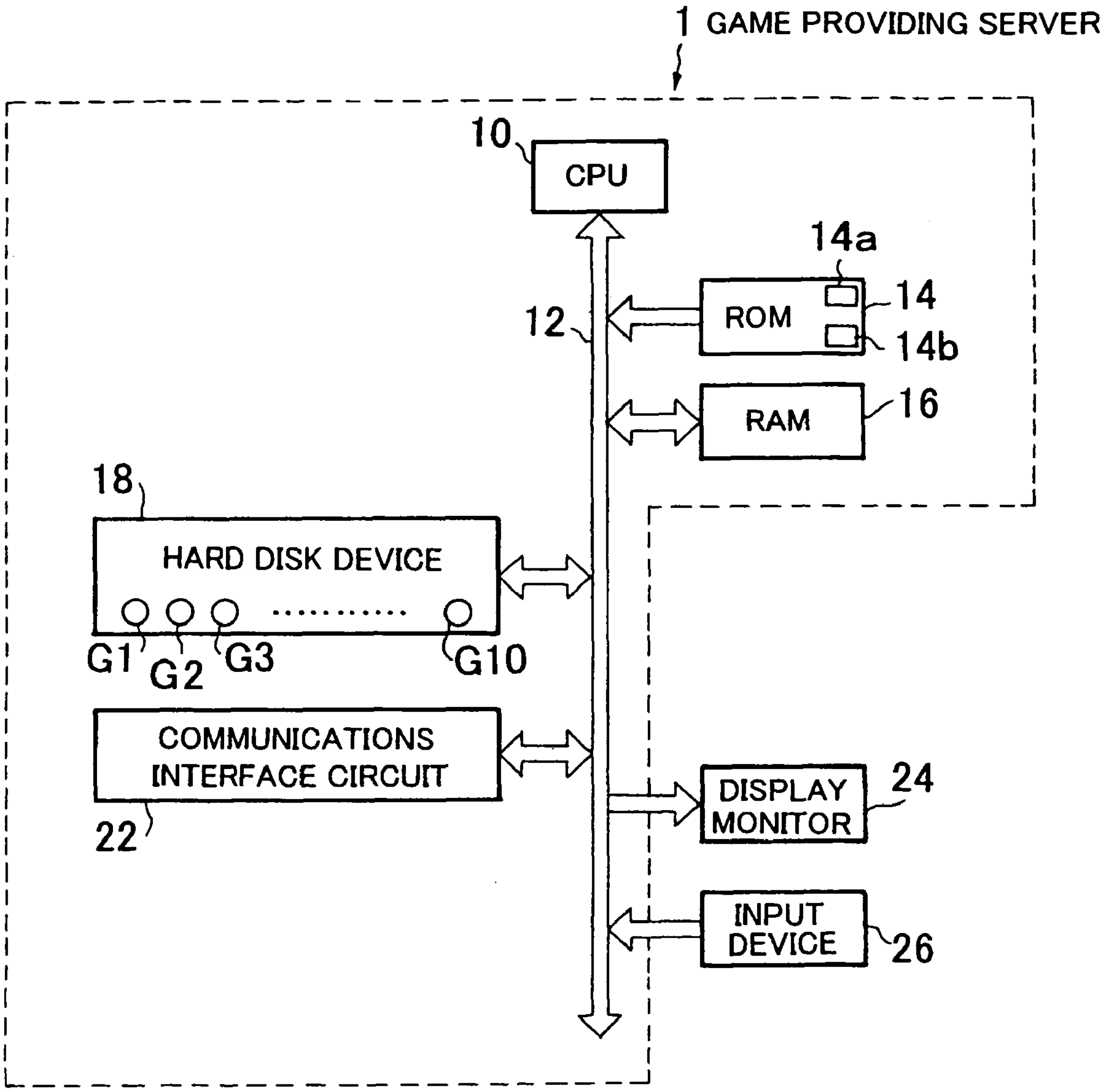
FIG. 2 is a block diagram showing the control composition of a game providing server according to an embodiment of the present invention.

FIG. 2 is a block diagram showing an example of the detailed composition of the game providing server 1.

In FIG. 2, the game providing server 1 comprises a CPU 10, a ROM 14, a RAM 16, a hard disk device 18, a communications interface circuit 22, a display monitor 24, an input device 26, and the like, which are mutually connected by means of an input/output bus 12.

The CPU 10 controls the various sections of the game providing server 1, in accordance with a program or the like stored in the ROM 14. The ROM 14 stores various programs to be executed by the CPU 10, fixed data, and the like, and the RAM 16 is used as a working memory, program memory, or the like, when the CPU 10 carries out processing. The ROM 14 or RAM 16 may of course be substituted by storage devices of other types, such as semiconductor memories.

The programs stored in the ROM 14 include: (1) a program 14*a* for providing a game program requested by a game selection-enabled gaming machine 2, to that game selection-enabled gaming machine 2; and (2) a program 14*b* for managing the game status, and the like, of the respective game selection-enabled gaming machines 2; and the like.

The hard disk device 18 is provided as a large-capacity storage device. Therefore, it may also be substituted with another storage device, such as an optical disk device. Desirably, it is a storage device which allows the stored game programs to be rewritten. The hard disk device 18 stores, for example, a plurality of types (here, 10 types) of game programs G1-G10 which can be provided to the game selection-enabled gaming machines 2 by the game providing server 1, together with the attribute information for each game (for example, the unit gaming fees which can be used in relation to that game). Furthermore, the hard disk device 18 stores management information for the respective game selection-enabled gaming machines 2, for example.

The communications interface circuit 22 has an interface function for communicating with the respective game selection-enabled gaming machines 2 via the network N. There are no particular restrictions on the communications protocol for performing communications between the game providing server 1 and the game selection-enabled gaming machine 2, but the communications interface circuit 22 performs interface processing in accordance with the communications protocol being employed. One communications interface circuit 22 may be interposed in the communications with all of the game selection-enabled gaming machines 2, or a plurality of communications interface circuits 22 may be provided. In the latter case, the game selection-enabled gaming machines 2 may be grouped on the basis of the installation area, or the like, and a communications interface circuit 22 may be associated with each group of machines, or alternatively, a free communications interface circuit 22 may be assigned each time a new communication arises.

The input device 26 is a device at which an arcade manager, or the like, can make inputs to and control the game providing server 1, and the display monitor 24 displays current status data relating to the game providing server 1, requested data, operating guidance data, and the like, to the arcade manager, or the like. It is also possible to provide another output device, such as a printer, in addition to the display monitor 24.

For example, the display monitor 24 displays various types of data stored in the hard disk device 18 incorporated into the game providing server 1, such as the game status, the total number of coins inserted and paid out, the operating rate, and the like, of each game selection-enabled gaming machine 2 connected to the game providing server 1 via the network N. Furthermore, the input device 26 inputs a command for changing the type of data displayed on the display monitor 24.

The input device required in order to rewrite (or add to) the game programs stored in the hard disk device 18 may be different from the keyboard, and the like, at which the arcade manager, or the like, inputs instructions to the game providing server 1 (for example, it may be a CD-ROM access device).

(External Composition of Game Selection-Enabled Gaming Machine)

Figure 3:
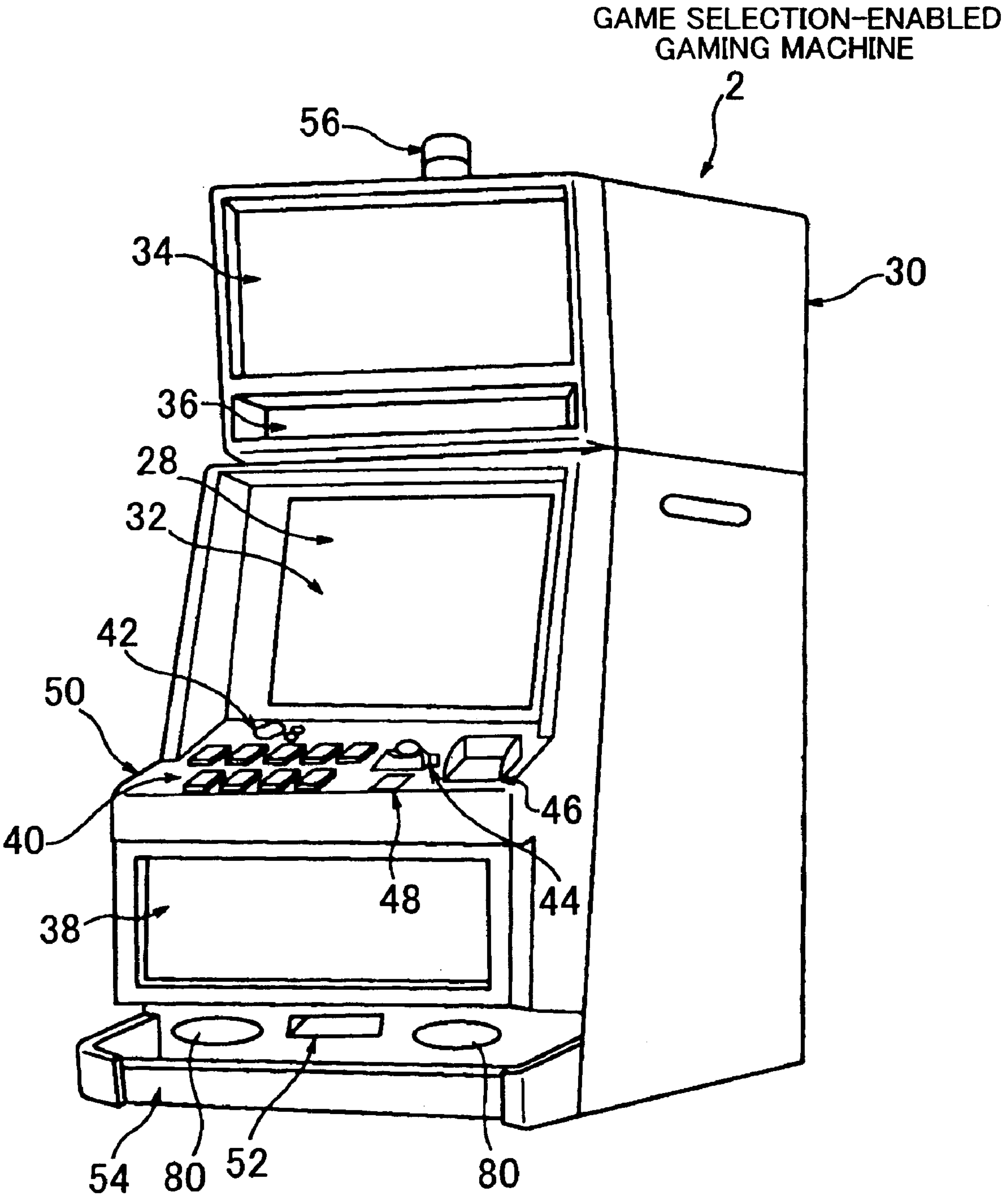
FIG. 3 is an oblique diagram showing the external appearance of a game selection-enabled gaming machine according to an embodiment of the present invention.

FIG. 3 is an oblique diagram showing one example of a game selection-enabled gaming machine 2 according to a first embodiment.

In FIG. 3, the external structure of the game selection-enabled gaming machine 2 is constituted by a cabinet 30. A main display device 32 is provided on the central portion of the cabinet 30, and the upper portion of the front side of the main display device 32 tilts slightly rearwards with respect to the lower portion. The main display device 32 displays, for example, game information of the respective games of the game type selected by the player, and the respective games proceed on this main display device 32. Furthermore, the main display device 32 also displays a game type selection image (see FIG. 14), for example, during a period described further below. A touch panel 28 is provided on the surface of the main display device 32.

A first sub display device 34 is provided above the main display device 32. The first sub display device 34 displays information which cannot be displayed completely on the main display device 32, or a description of the rules of the game being executed on the main display device 32, or the like. In a single-game gaming machine, such as a conventional video poker gaming machine, or the like, a panel showing the name of the game and an illustration for creating an identifying force for the single-game gaming machine, or a written description of the rules of play, is attached in the section corresponding to the first sub display device 34, but in the first embodiment of the present invention, it is possible to execute a plurality of types of games on the same game selection-enabled gaming machine 2, and therefore the display contents of the first sub display device 34 are variable in accordance with the game being executed.

A second sub display device 36 is provided between the main display device 32 and the first sub display device 34. The second sub display device 36 is able to show a display similar to ornamental lights, such as flashing text or symbols, in accordance with the state of the game, or to display text information which scrolls from the right-hand side to the left-hand side of the display device.

An indication lamp 56 for indicating a fault in the game selection-enabled gaming machine 2 or a big winning, or the like, is provided on top of the cabinet 30.

A virtually horizontal operating panel 50 is provided below the main display device 32, and a plurality of switches 40, and a cross switch 42, are provided on the left-hand side of the panel 50. These switches 40 and 42 are used to perform instructions, such as selection and determination in the respective games.

Furthermore, a coin insertion slot 44 and a bill insertion slot 46 are provided on the right-hand side of the operating panel 50. A pay-out switch 48 is also provided in the vicinity of the coin insertion slot 44, and by pushing this switch 48, a number of coins corresponding to the remaining credit at that time is paid out via a coin pay-out opening 52 in the lower part of the front surface of the cabinet 30, and the coins thus paid out are collected in a coin tray 54.

In the foregoing description, both coins and bills are accepted when inserting money to be used as a unit gaming fee, and only coins are used when paying out the remaining credit, but it is also possible to use coins only for inserting and paying out, and it is also possible to use both coins and bills for inserting and paying out. Furthermore, it is also possible to enable various denominations of coins and bills to be handled. Moreover, instead of paying out coins, it is also possible to output a receipt on which the number of coins to be paid out is printed. In this case, the receipt is exchanged for coins, or the like, at an exchange site, for example.

A third sub display device 38 is provided in the lower part of the cabinet 30, above the coin pay-out opening 52, and this display device is able to display various types of information, such as information supplied by the casino where that gaming machine 2 is located, for example.

Furthermore, (apertures for) a pair of audio output speakers 80 are provided on the left and right-hand sides of the coin pay-out opening 52.

(Control composition of Game Selection-Enabled Gaming Machine)

Figure 4:
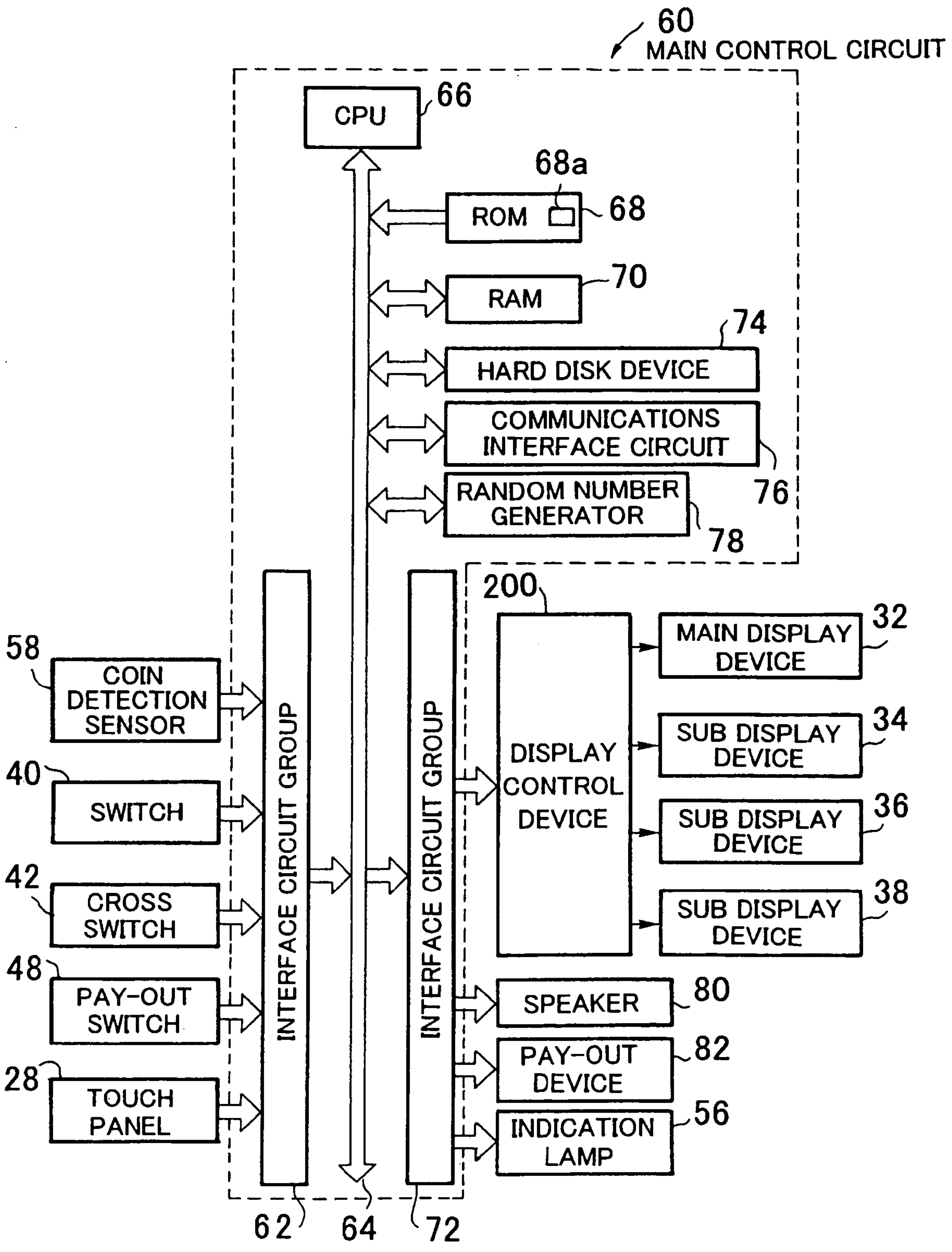
FIG. 4 is a block diagram showing the control composition of a game selection-enabled gaming machine according to an embodiment of the present invention.

FIG. 4 is a block diagram showing the composition of the control implemented in a game selection-enabled gaming machine 2 according to a first embodiment.

One or a plurality of circuit boards mounted with a main control circuit 60, which is a compositional element, as shown in FIG. 4, is/are provided inside the cabinet 30 of the game selection-enabled gaming machine 2.

In the main control circuit 60, a CPU 66, ROM 68, RAM 70, hard disk device 74, communications interface circuit 76 and random number generator 78 are connected via the input/output bus 64, and an input interface circuit group 62 and an output interface circuit group 72 connected to the input/output bus 64 are also provided.

The CPU 66 controls the various sections of the game selection-enabled gaming machine 2, and controls the progress of the game, in accordance with a program stored in the ROM 68, a program stored in the hard disk device 74 or RAM 70 (hereinafter, called a "game program"), or the like.

The ROM 68 stores programs of various types executed by the CPU 66, fixed data, and the like. The ROM 68 also stores, for example, a game selection program 68*a* whereby the player selects the type of game to be executed by the game selection-enabled gaming machine 2.

The RAM 70 is used as a working memory when the CPU 66 is carrying out processing. Furthermore, in the case of this first embodiment, while a game is in progress, all or a portion of the game program downloaded from the game providing server 1 is stored in the RAM 70, according to requirements, as described hereinafter, and the program is supplied from the RAM 70 for execution by the CPU 66.

The ROM 68 or RAM 70 may of course be substituted by storage devices of other types, such as semiconductor memories.

The hard disk device 74 is provided as a large-capacity storage device. Therefore, it may also be substituted with another storage device, such as an optical disk device. The hard disk device 74 stores, for example, a game program of the type selected by the player, which has been downloaded from the game providing server 1 (any of the games G1-G10 described above). Here, a downloaded game program may be executed by the CPU 66 from its storage location on the hard disk device 74, but it is also possible to copy the downloaded program, completely, or part by part, into the RAM 70, thereby supplying the program for processing by the CPU 66.

The hard disk device 74 also stores management information, such as a journal, for example, according to requirements.

The communications interface circuit 76 has an interface function for communicating with the game providing server 1 via the network N. Unique ID numbers are assigned to the game providing server 1 and the respective game selection-enabled gaming machines 2, and hence the communications source and destination can be identified universally by means of these ID numbers, and the communications interface circuit 76 can determine whether or not a communication is directed to the machine in which it is installed. The same applies to the communications interface circuit 22 installed in the game providing server 1.

The random number generator 78 generates random numbers under the control of the CPU 66. The CPU 66 generates a random number at the timing that a determination is required concerning how to progress when the path of the selected game branches, and it also generates a random number when determining the game result of the currently selected game type.

The input interface circuit group 62 reads in instruction signals from the various switches 40, 42, 48 described above.

Furthermore, an input detection sensor 58 which detects the insertion of a coin, bill, or the like (depicted as one block in FIG. 4, although in fact separate sensors are provided for coins and bills) is connected to the input interface circuit group 62, and when a coin is inserted into the aforementioned coin insertion slot 44, or when a bill is inserted into the bill insertion slot 46, then insertion information relating to the types and number of the inserted coins or bills is supplied.

Moreover, a touch panel 28 is connected to the input interface circuit group 62, and information indicating the contact position on the touch panel 28 is read in appropriately.

The CPU 66 described above switches processing, and the like, as appropriate, in accordance with input information, and the like, from the input interface circuit group 62.

The speakers 80, indication lamp 56 and pay-out device 82 are connected to the output interface circuit group 72, and the interface circuit group 72 drives and controls the speakers 80, indication lamp 56, pay-out device 82, and the like, under the control of the CPU 66.

Furthermore, a display control device 200 is also connected to the output interface circuit group 72, and the display control device 200 controls the main display device 32, and the first to third sub display devices 34, 36 and 38, on the basis of an image display command issued by the main control circuit 60. The display control device 200 is installed on a circuit board (not limited to being only one circuit board), which is different from the circuit board on which the main control circuit 60 is installed.

(Composition of Display Control Device in Game Selection-Enabled Gaming Machine)

Figure 5:
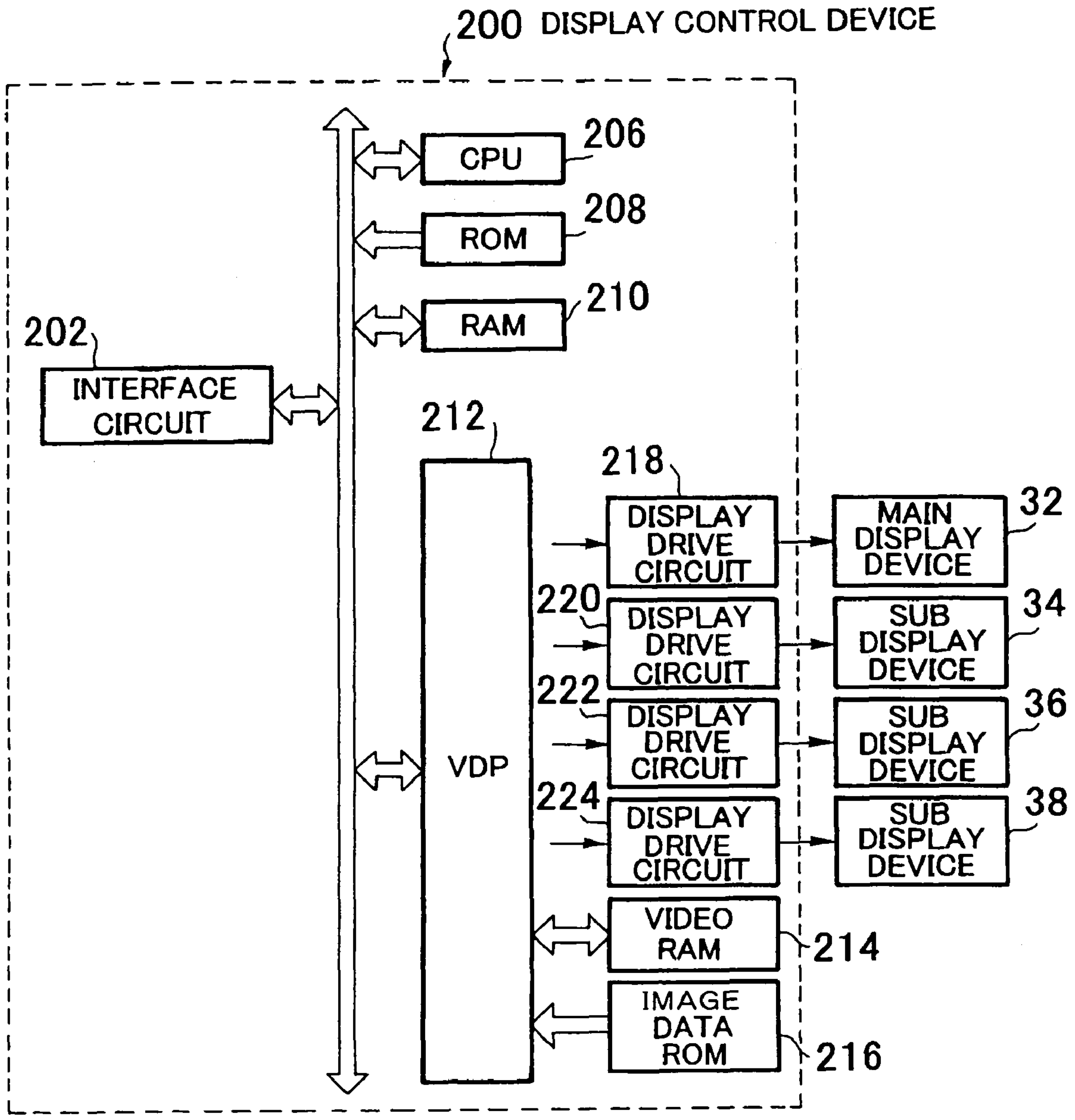
FIG. 5 is a block diagram showing the display control composition of a game selection-enabled gaming machine according to an embodiment of the present invention.

FIG. 5 is a block diagram showing the detailed composition of the display control device 200.

In FIG. 5, the display control device 200 comprises a CPU 206, a ROM 208, a RAM 210, an interface circuit 202, a video display processor (VDP) 212, a video RAM 214, an image data ROM 216, and four display drive circuits 218, 220, 222 and 224; the CPU 206, ROM 208, RAM 210, interface circuit 202 and video display processor 212 are connected to the input/output bus 204, and the video RAM 214, image data ROM 216, and four display drive circuits 218, 220, 222 and 224 are connected to the video display processor 212.

The interface circuit 202 receives and processes image display commands, and the like, from the main control circuit 60 described above, and supplies these commands to the CPU 206, via the input/output bus 204.

The CPU 206 executes the display control program stored in the ROM 208, on the basis of the image display command thus supplied, using the RAM 210 as a working memory, and it instructs the video display processor 212 to carry out the actual image display processing. Here, the data, and the like, required for display control which forms one part of the game program is stored in the RAM 210. The ROM 208 and RAM 210 may be other storage media.

The video display processor 212 includes circuits, such as a so-called sprite circuit, screen circuit and palette circuit, and the like, which carry out various image processing for displaying images on the main display device 32 and the first to third sub display devices 34, 36 and 38; Here, the game images are displayed on the main display device 32. A video display processor (VDP) may be provided separately for the each of the main display device 32 and first to third sub display devices 34, 36 and 38.

The video RAM 214, which stores image data in accordance with image display command issued by the main control circuit 60, and the image data ROM 216, which stores image data, such as image data for a background, image data for symbols, image data for characters, and the like, are connected to the video display processor 212. The display drive circuits 218, 220, 222 and 224 which drive the main display device 32 and the first to third sub display devices 34, 36 and 38 are also connected to the video display processor 212.

The CPU 206 stores the image data to be displayed on the main display device 32, in the video RAM 214, in accordance with the image display command issued by the main control circuit 60, by reading out and executing a display control program stored in the ROM 208. The image display commands issued by the main control circuit 60 include display commands such as a background display command, a symbol display command, a character display command, and the like.

Furthermore, as described above, the image data ROM 216 stores image data for a symbol image, which is an identification information image, character image data for a character, such as a moving object displayed as an effect screen, and background image data forming the background of the main display device 32, and the like.

The symbol image data described above is used when symbols are variably displayed on the main display device 32, or when symbols are stopped and displayed, and it includes image data according to various different display modes, such as enlarged images, reduced images, modified images, and the like. Furthermore, the character image data described above includes image data required in order to display a mode where a character performs a sequence of actions.

Figure 6:
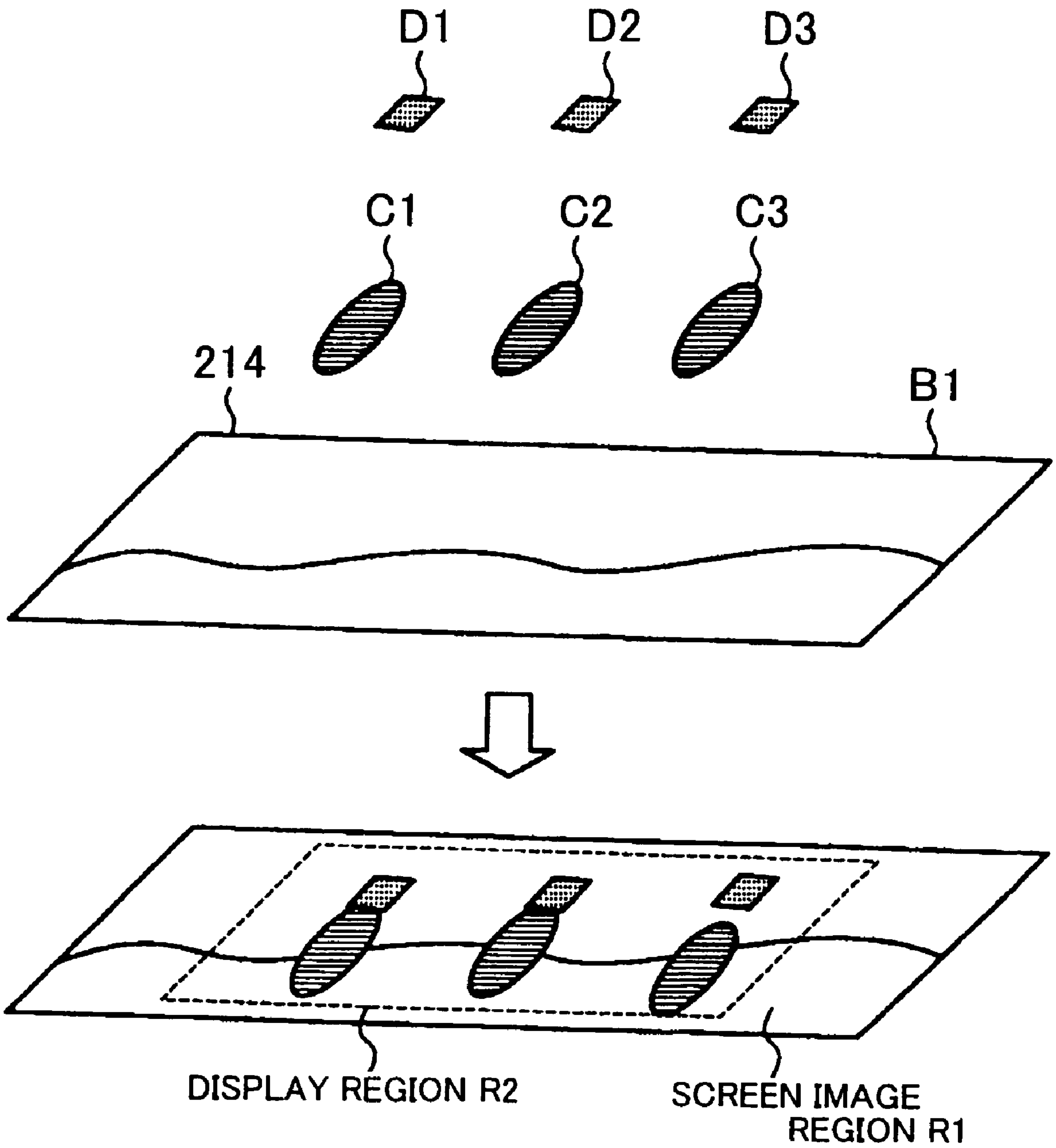
FIG. 6 is an illustrative diagram of a method of forming a display image according to an embodiment of the present invention.

FIG. 6 is a schematic drawing illustrating the concept of image data generated in the aforementioned video RAM 214.

As shown in FIG. 6, the size of the image data generated in the video RAM 214 in accordance with the image display command (hereinafter, called the "screen image region" R1) is set to be greater than the display region R2 shown on the main display device 32. In FIG. 6, the screen image region R1 is the region demarcated by the solid line and the display region R2 is the region demarcated by the broken line. By setting the size of the image data in this way, it is possible to provide a smoothly scrolling display of the image that is to be shown on the main display device 32.

If a symbol display command is issued by the main control circuit 60, then the video display processor 212 reads out the image data for the respective images D1 to D3 showing symbols which are identification information images, from the image data ROM 216, and it then situates the image data thus read out in a position in the video RAM 214 which corresponds to the position at which the symbol image is to be displayed on the main display device 32. Furthermore, if a character display command is issued by the main control circuit 60, then the video display processor 212 reads out the image data for the respective character images C1 to C3, from the image data ROM 216, and it then situates the image data thus read out in a position in the video RAM 214 which corresponds to the position at which the character image is to be displayed on the main display device 32. Furthermore, if a background display command is issued by the main control circuit 60, then the video display processor 212 reads out the image data for the background image B1, from the image data ROM 216, and it then situates the image data thus read out in a position in the video RAM 214 which corresponds to the position at which the background image is to be displayed on the main display device 32.

After image data has been generated in the video RAM 214, the video display processor 212 reads out only the image data stored in the display region R2, from the video RAM 214, and supplies this data to the drive circuit 218, as a display signal.

(Example of Image Display)

An image is displayed on the main display device 32 by storing image data in the video RAM 214, and the game progresses. FIG. 7 to FIG. 11 show examples of image displays.

Figure 7:
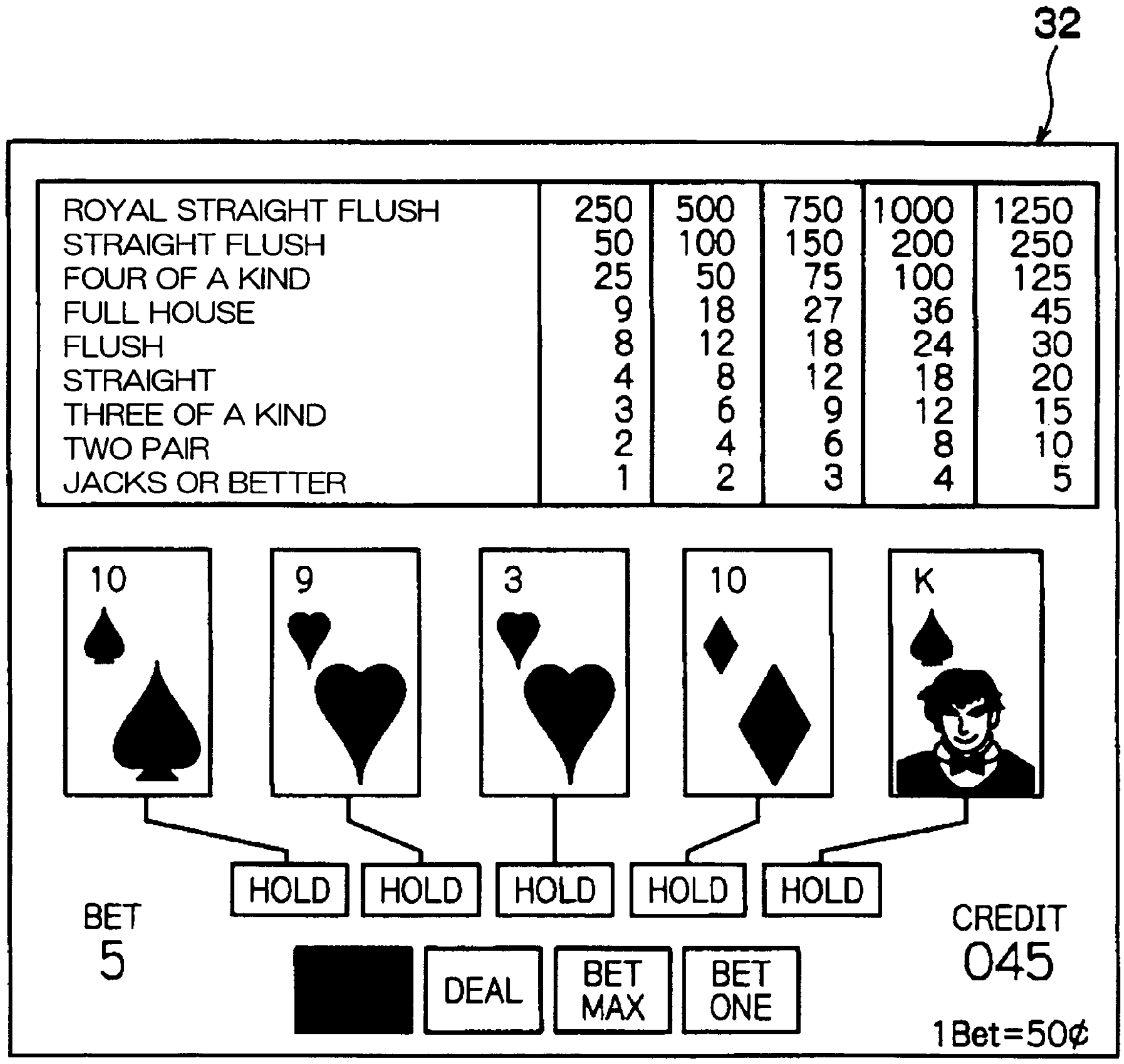
FIG. 7 is an illustrative diagram showing a game image example (1) according to an embodiment of the present invention.

FIG. 7 is an example of a case in which a video poker game screen is displayed on the main display device 32. More specifically, in the game selection-enabled gaming machine 2, a video poker game is selected, a video poker game program is downloaded from the game providing server 1, the main control circuit 60 supplies a screen display command to the display control device 200, in accordance with the video poker game program, and the display control device 200 causes the main display device 32 to display the game screen shown in FIG. 7.

The five cards in the player's hand are displayed in one horizontal row in the central part of the screen, whereby the player can play the game.

Furthermore, a list of the types of hands and the number of coins paid out according to the bet is displayed in the upper part of the screen, and the number of coins that can be paid back to the player is also indicated.

Furthermore, a plurality of rectangular-shaped figures containing text characters are displayed in the center of the lower part of the screen. These figures correspond to the switches 40 of the game selection-enabled gaming machine 2, and by pushing a corresponding switch 40, the processing indicated by the text characters shown inside the relevant figure is implemented. By this means, even if a plurality of types of game are implemented by one game selection-enabled gaming machine 2, it is possible to make the player recognize what type of operation is associated with each of the respective switches 40, when they are pushed. Furthermore, if the player touches a position on the touch panel 28 where a rectangular-shaped figure is displayed, then it is also possible for similar processing to be implemented as that implemented when the corresponding switch 40 is operated.

Moreover, the number of coins bet in the current game (BET number), the total number of coins accumulated into the game selection-enabled gaming machine 2 (CREDIT), and the type of coin per unit required for one betting game (BET: unit gaming fee), are displayed at the left and right-hand ends of the lower part of the screen. In the example in FIG. 7, the player has bet five coins in the current betting game, and the remaining 45 coins have been accumulated into the game selection-enabled gaming machine 2 as the player's credit. Furthermore, the type of coin of the unit required for one betting game is set to 50 cents.

The type of coin per unit (BET; unit gaming fee) is set by the player, as described hereinafter. The total number of coins displayed (CREDIT) is the number of coins calculated by dividing the total amount of money accumulated, by the unit gaming fee indicated by the established type of coin. It is also possible to display the number of coins of a previously established denomination (for example, one-dollar coins) in the total number of coins (CREDIT) column, regardless of the type of coin established as the unit gaming fee.

Figure 8:
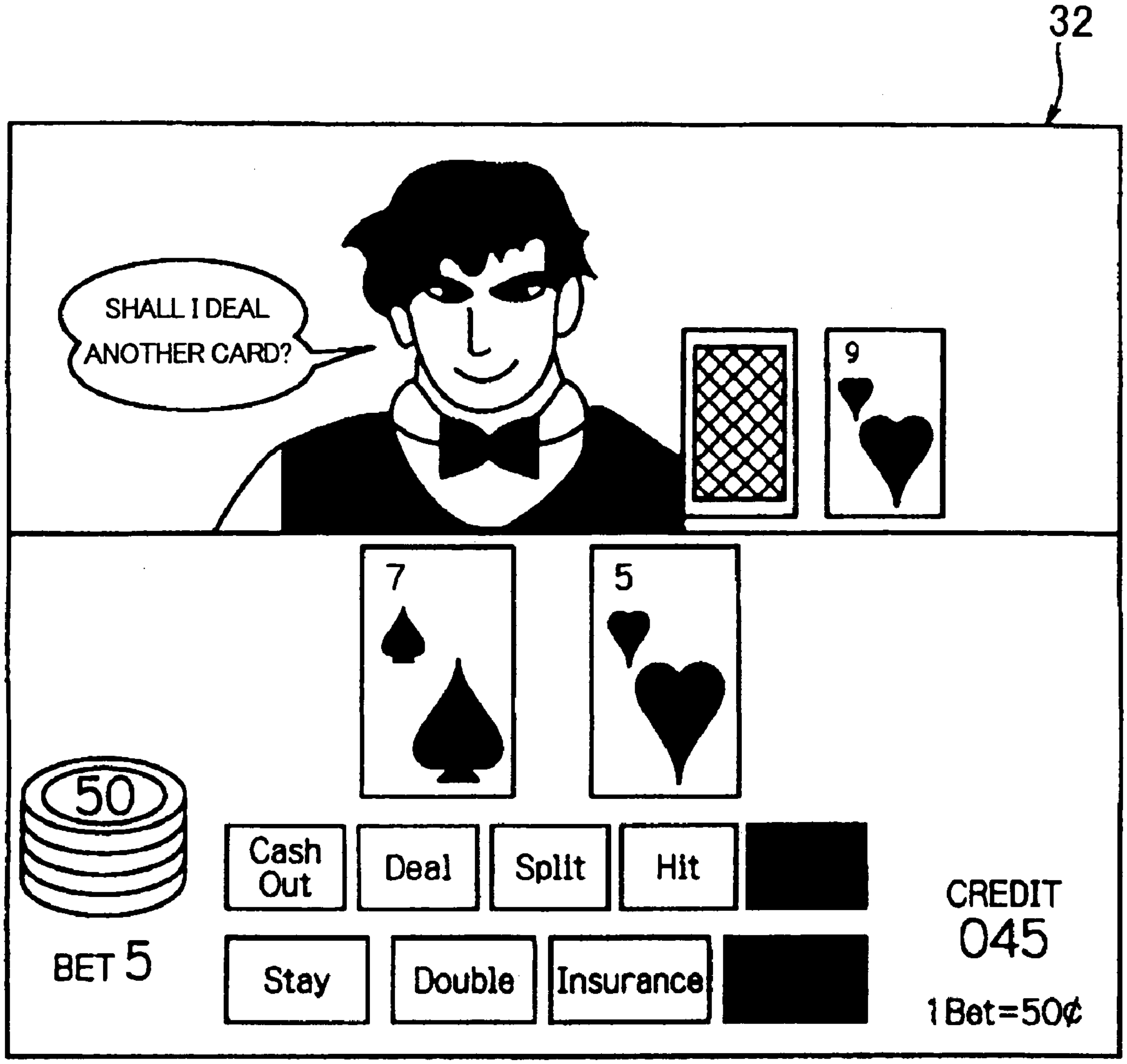
FIG. 8 is an illustrative diagram showing a game image example (2) according to an embodiment of the present invention.
Figure 9:
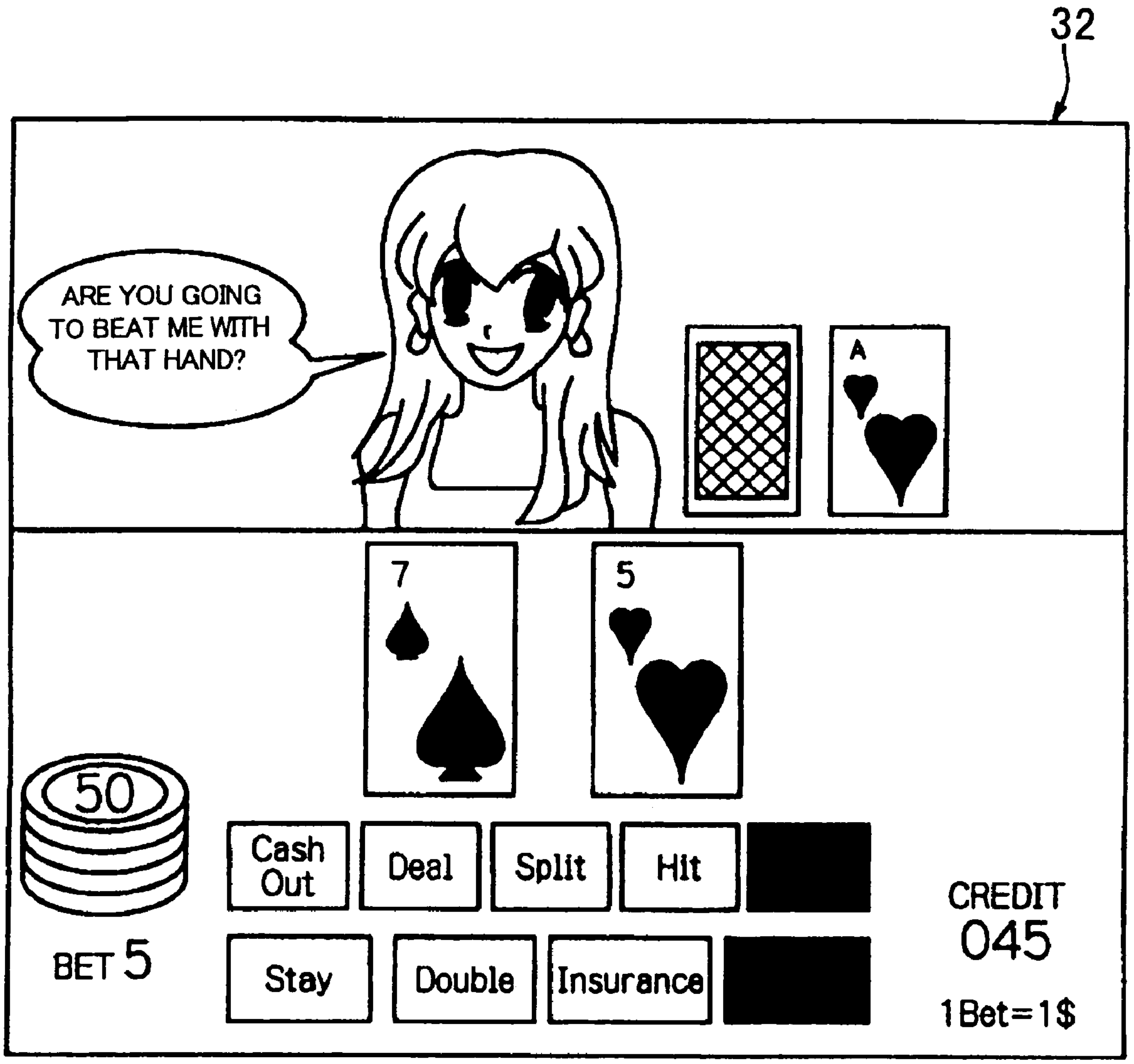
FIG. 9 is an illustrative diagram showing a game image example (3) according to an embodiment of the present invention.

FIG. 8 and FIG. 9 are examples of a case in which a blackjack game screen is displayed on the main display device 32. More specifically, in the game selection-enabled gaming machine 2, a blackjack game is selected, a blackjack game program is downloaded from the game providing server 1, the main control circuit 60 supplies a screen display command to the display control device 200, in accordance with the blackjack game program, and the display control device 200 displays the game screen shown in FIG. 8 or FIG. 9 on the main display device 32.

The cards in the player's hand are displayed in a horizontal alignment in the central part of the screen, whereby the player can play the game.

Moreover, an animated image of a virtual dealer, and the dealer's hand, is depicted in the upper part of the screen. The game proceeds by means of the virtual dealer saying, for instance, "Shall I deal another card?" as shown in FIG. 8, in accordance with the game status.

This virtual dealer is displayed by means of a separate program to the blackjack game program, and within the same game program, it is possible to change the virtual dealer, as shown in FIG. 8 and FIG. 9. Consequently, it is possible to create the impression of a different game, even using the same game program, by changing the appearance and/or character of the virtual dealer, and therefore the player's enjoyment of the game can be increased.

Moreover, a display of instructions corresponding to the switches 40, the number of coins bet in the current game, the total number of coins accumulated into the game selection-enabled gaming machine 2, and the type of coin per unit required for one betting game, are displayed at the lower part of the screen. Moreover, an image of the number of coins that have been bet is also displayed, thus creating a greater sense of reality.

In addition, in the example in FIG. 8, the type of coin of the unit required for one betting game is set to 50 cents, whereas in the example in FIG. 9, the type of coin of the unit required for one betting game is set to one dollar. The type of coin of the unit required for one betting game is set in conjunction with the game type selection processing, as described hereinafter. Depending on the type of game, it is possible to vary the number of types of coin per unit that can be selected, and it is also possible to make the number of types of coin one type only.

Figure 10:
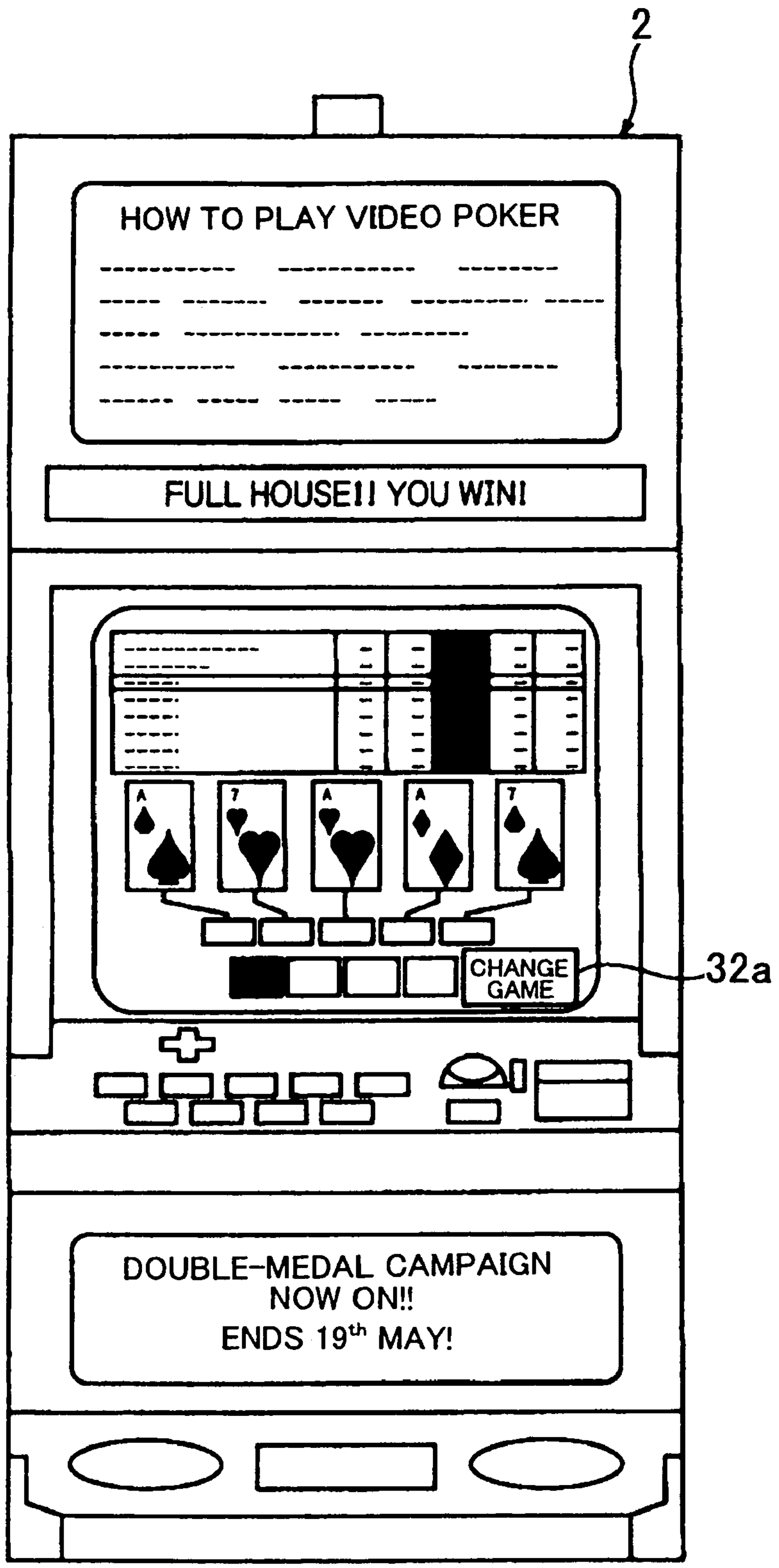
FIG. 10 is a schematic front view during gaming on a game selection-enabled gaming machine according to an embodiment of the present invention.

FIG. 10 shows an example of the display in the whole game selection-enabled gaming machine 2 during a game. The main display device 32 shows an image in which a video poker game has been executed and the player's hand has finished as a "full house". In this case, the second sub display device 36 displays flashing text stating "FULL HOUSE!! YOU WIN!!", and an effect of celebrating the win of the player in the current game is created. Furthermore, a description of the method of playing a video poker game is displayed on the first sub display device 34, in order that even a novice will know how to operate the machine, without problem. Accordingly, it is possible to avoid situations where a written description for all of the games that can be played on that game selection-enabled gaming machine 2 have to be shown in the vicinity of the gaming machine. Furthermore, the third sub display device 38 is able to display an announcement from the game arcade, such as "Double-medal campaign now on!! Ends $19^{th}$ May!", or advertisements, or the like.

Here, a "Change game" icon 32*a* is displayed on the main display device 32, and by means of the player touching this icon 32*a* (namely, touching the corresponding position on the touch panel 28), the machine transfers to a game selection operation, which is described hereinafter. The display device which displays the "Change game" icon is not limited to being the main display device 32, but it should be a display device provided in association with a touch panel. Furthermore, it is also possible to provide a special key or a generic key for the "Change game" operation.

Figure 11:
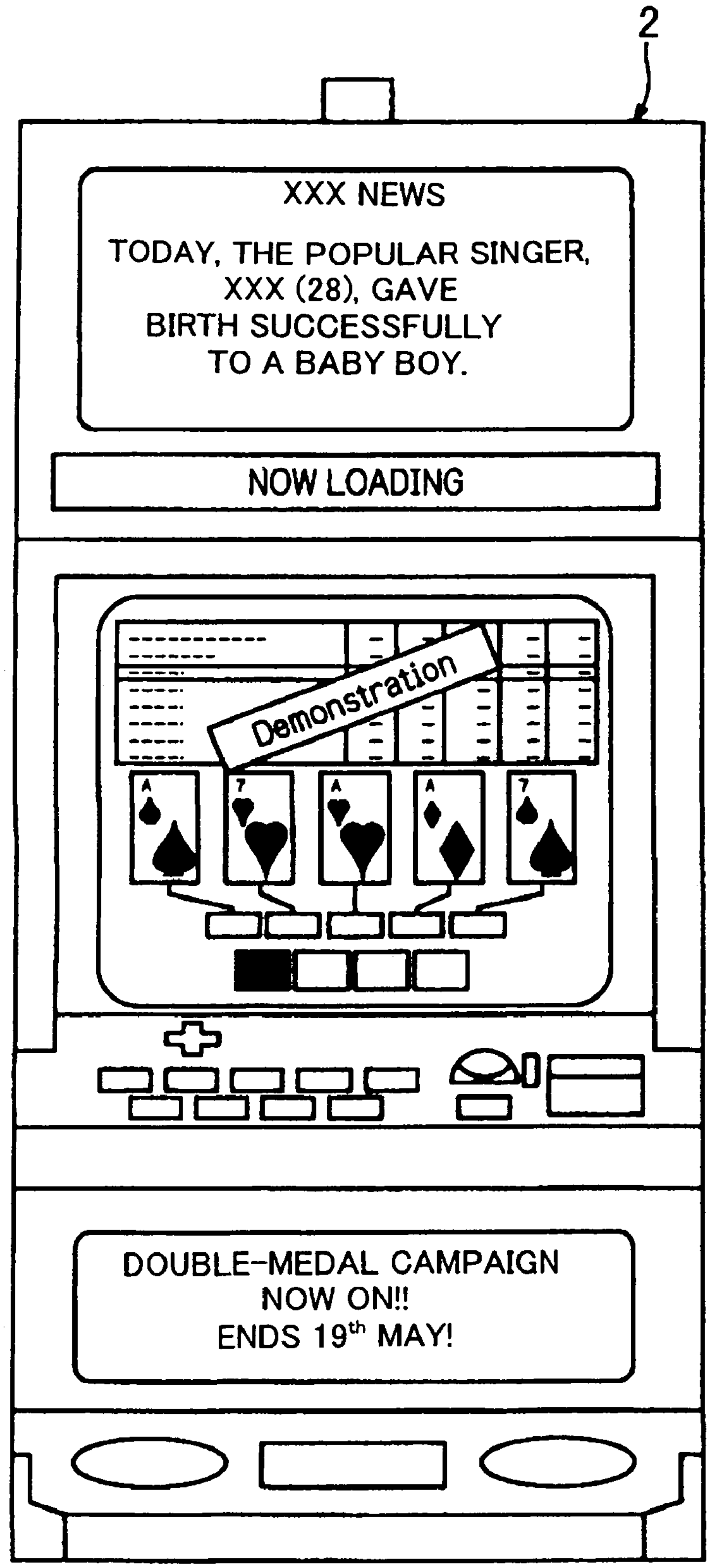
FIG. 11 is a schematic front view during downloading in a game selection-enabled gaming machine according to an embodiment of the present invention.

On the other hand, FIG. 11 shows a display example of the whole game selection-enabled gaming machine 2 during rewriting of a program. A game demonstration screen is displayed on the main display device 32, and therefore even in a state where the game is not being implemented due to rewriting of the program, it is possible to prevent the absence of an image display from impairing the bright appearance of the game arcade. By scrolling a display of the text characters "NOW LOADING" from right to left on the screen of the second sub display device 36, it is possible to inform the player that the game program is currently being rewritten. Furthermore, text information, such as news, can be displayed on the first sub display device 34, thereby providing various types of information to a player who is present in the game arcade for a long period of time. It is also possible for a display of this kind to be shown even when the game program is not being rewritten, and it is also possible to be shown on the second sub display device 36 or the third sub display device 38.

The image and text information which can be displayed on the respective display devices are not limited to the examples given above, and it is also possible to display these images on a display device other than the display device stated in the foregoing examples, or to display music videos, environmental videos, or the like, which may be displayed on the display devices.

(Game Type Selection Processing)

Next, the processing implemented in the aforementioned game providing server 1 and game selection-enabled gaming machine 2 when the player selects the type of game to be executed by the game selection-enabled gaming machine 2 will be described.

Figure 12:
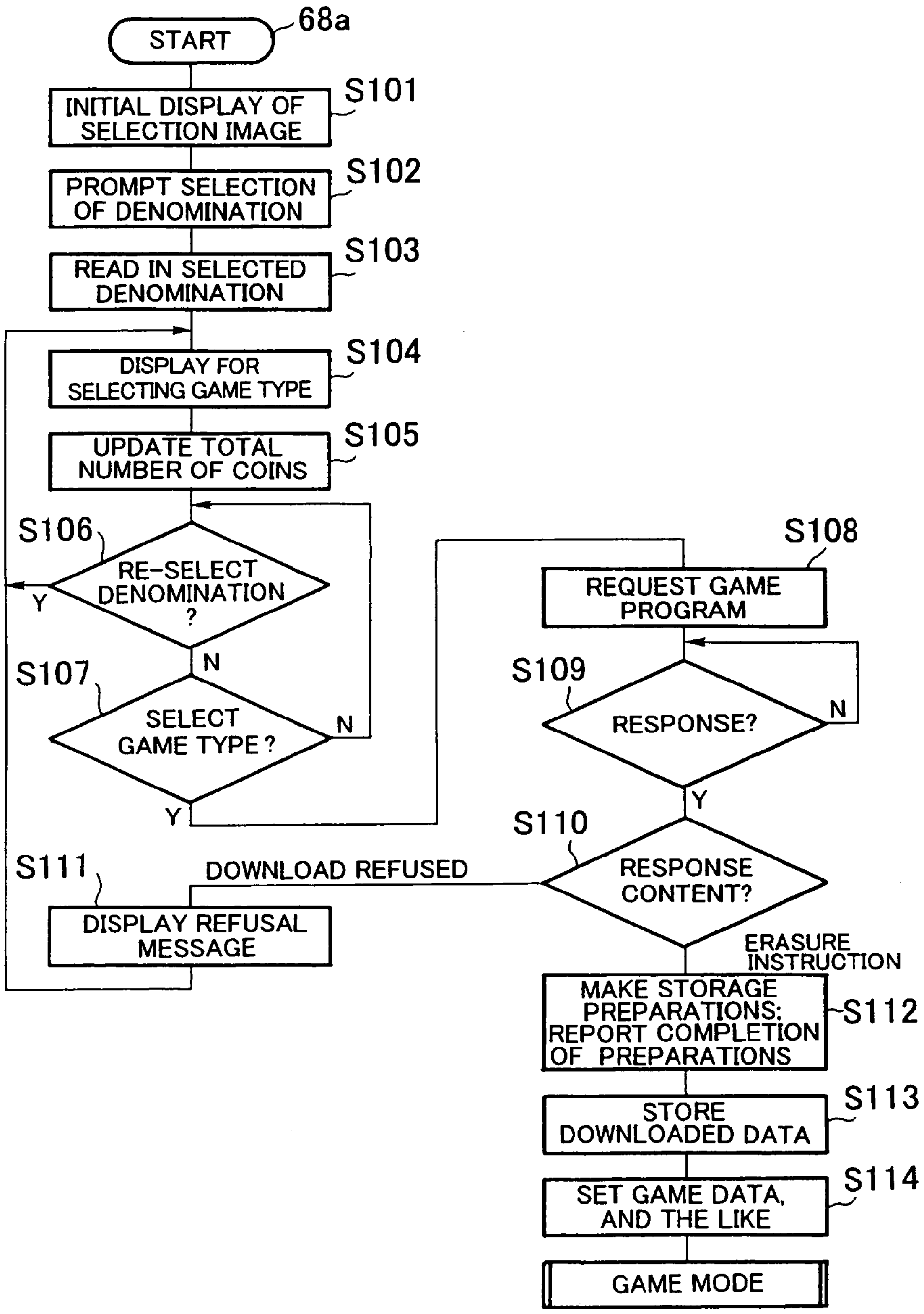
FIG. 12 is a flowchart showing game selection processing in a game selection-enabled gaming machine according to an embodiment of the present invention.
Figure 13:
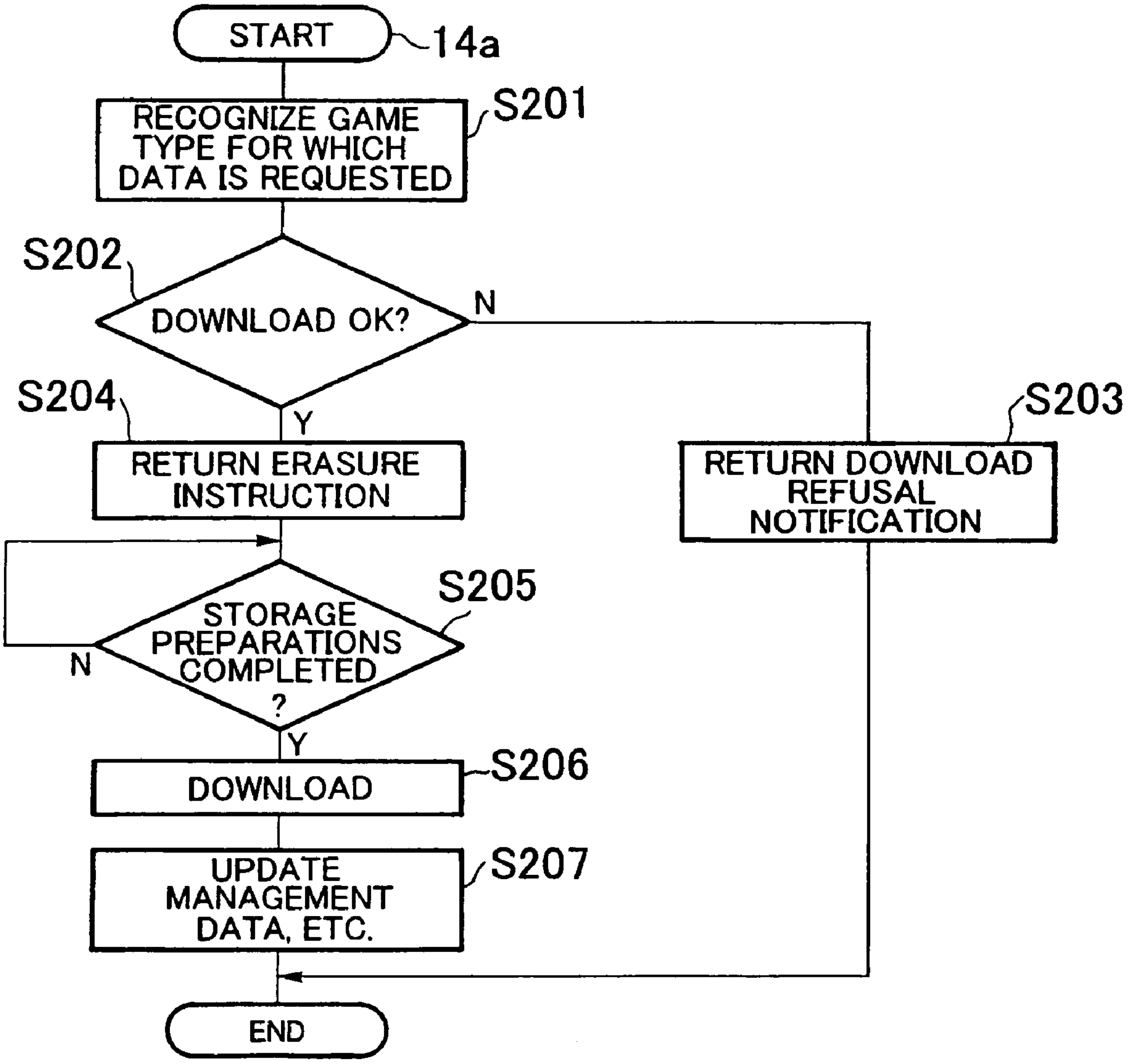
FIG. 13 is a flowchart showing game program provision processing in a game providing server according to an embodiment of the present invention.
Figure 14:
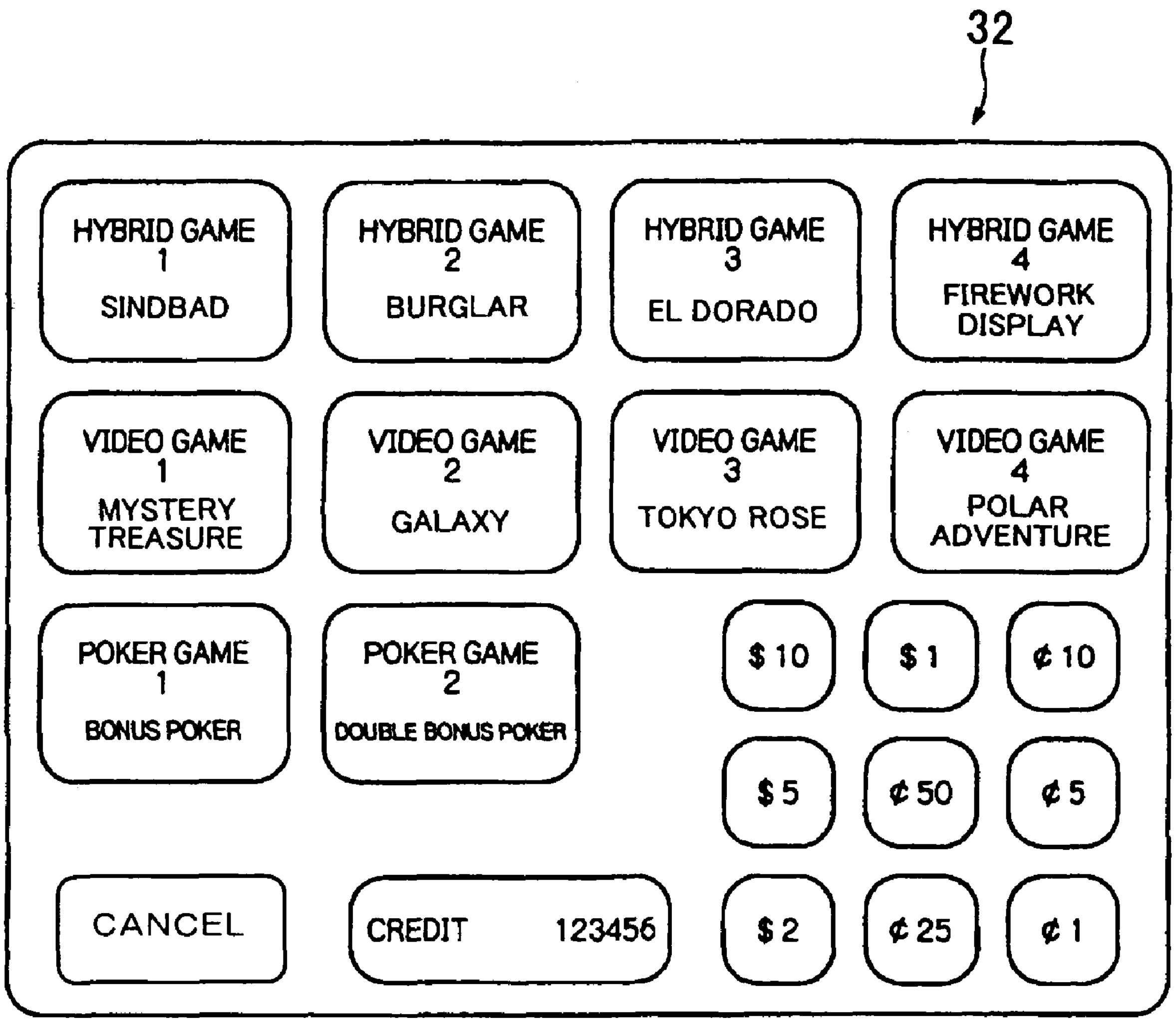
FIG. 14 is an illustrative diagram showing a game type selection display image in a game selection-enabled gaming machine according to an embodiment of the present invention.

Here, FIG. 12 is a flowchart showing the processing in the game selection-enabled gaming machine 2, FIG. 13 is a flowchart showing the processing in the game providing server 1, and FIG. 14 is an illustrative diagram showing a game type selection display image.

In a standby state (for example, after the number of accumulated coins has become zero and a prescribed time period has passed), the game selection-enabled gaming machine 2 proceeds to issue an instruction prompting a person wishing to play a game to insert coins or bills, on any of the display devices, and when it detects the insertion of a coin or bills in this standby state, then the processing shown in FIG. 12 (game selection program 68*a*) is started.

Firstly, the CPU 66 of the game selection-enabled gaming machine 2 causes the game type selection display image shown in FIG. 14 to be displayed on the main display device 32 (S101), and causes a display requesting the selection of the denomination (unit gaming fee) to be shown on any of the sub display devices (for example, the second sub display device 36) (S102). The display requesting the selection of a denomination (unit gaming fee) may also be superimposed on the game type selection display image.

As shown in FIG. 14, the game type selection display image comprises, for example, selection icons for all of the types of game offered by the game providing server 1, denomination (unit gaming fee) selection icons, a "Cancel" icon, and a column displaying the total number of coins (credit). In the initial state, the column displaying the total number of coins shows the total amount of money accumulated, divided by a previously established base denomination (for example, one dollar). Moreover, in the initial display state, the selection icons of all of the game types are reduced in display brightness, and selection icons of all of the denominations (unit gaming fees) are increased in display brightness.

When there is a large number of game types that can be offered by the game providing server 1, then the game type selection display image is divided into several pages. Furthermore, it is also possible to display the denomination selection image and the game type selection image, as separate images, in such a manner that the display can be switched between these images. In this case, in the initial state, for example, a denomination selection screen is displayed.

When information relating to a denomination (unit gaming fee) selected by means of the player operating an icon is read in from the touch panel 28 (S103), then the CPU 66 switches the game type selection display image to a display mode in which the game type is selected (S104), and it updates the display of the total number of coins in accordance with the selected denomination (S105).

In the display mode of the game type selection display image in which the game type can be selected, the selection icons relating to the game types which can be offered at the selected denomination are displayed in a distinct manner from the selection icons relating to the game types which cannot be offered at the selected denomination. Furthermore, the icon of the selected denomination can also be displayed in a distinct manner to the other denomination selection icons. For example, the distinctive display can be achieved by changing the brightness or the color of the display. Furthermore, for example, a distinctive display may also include a case where the selection icons relating to the game types which can be offered at the selected denomination are displayed, whereas the selection icons relating to the game types which cannot be offered at the selected denomination are not displayed.

If, for example, the amount of money introduced is 15 dollars, and the selected denomination is 25 cents, then the total number of coins is updated from "15" to "60".

FIG. 15 shows a game type/denomination correspondence table contained in the fixed data which constitutes the game selection program 68*a*. The game type/denomination correspondence table associates the game types with the denominations which can be selected with that game type. When a denomination has been selected, the CPU 66 accesses the game type/denomination correspondence table, and recognizes the game types that can be offered at the selected denomination. For example, the game type "HYBRID GAME 1" can be selected if 1 cent or 5 cents has been selected as the denomination, but it cannot be selected if another denomination apart from these has been selected. Furthermore, the game type "HYBRID GAME 2" can be selected if 5 cents or 10 cents has been selected as the denomination, but it cannot be selected if another denomination apart from these has been selected. In this way, the selectable denominations vary for each game type, and therefore it is possible to reflect the complexity of a game, the time taken to play one round of the game, and the like, in the available denominations. Therefore, for example, it is possible to ensure that the daily sales of a game selection-enabled gaming machine 2 are virtually the same, whichever game is selected.

In a state where the game type selection display image is shown in a display mode which permits selection of the game type, the CPU 66 waits for the player to operate a denomination selection icon, or one of the selection icons for the game types which can be selected with the currently selected denomination (S106, S107). If a selection icon for an non-selectable game type is operated, then the CPU 66 ignores that operation.

If a denomination selection icon is operated, then the CPU 66 returns to step S104 described above and switches to a display corresponding to the newly selected denomination.

On the other hand, if the selection icon of a game type which is selectable at the currently selected denomination is operated, then the CPU 66 requests the game program of the selected game type, from the game providing server 1, by means of the communications interface circuit 76 (S108), and waits for a response from the game providing server 1 (S109). The related processing step is not described here, but during this wait, the CPU 66 causes a prescribed display device to implement a display which informs the player that the gaming machine is communicating with the game providing server 1. Furthermore, the game program request information may also include, in addition to information relating to the game type, information relating to the selected denomination.

Even if the selected game type is the same as the game program stored in the hard disk device 74, it is still possible to request a download, in order to clarify the management operations of the game providing server 1. On the other hand, in a case of this kind, it is also possible to use the game program stored in the hard disk device 74, without requesting download, in order to speed up the start of the game (in this case, desirably, the selection of that game program is reported to the game providing server 1).

When there is a response from the game providing server 1, the CPU 66 determines whether it is an instruction to erase the stored game program, or a download refusal notification (S110).

If the response is a download refusal notification, then the CPU 66 displays a message indicating that the game type in question cannot be selected, in a superimposed fashion on the game type selection display image, for a prescribed time period (S111), and then returns to step S104 described above, where the player is made to select the game type, and the like, again.

If an instruction to erase the stored game program has been received, then the CPU 66 clears the storage area of the game program on the hard disk device 74 and then reports the completion of storage preparations, to the game providing server 1 (S112). Thereupon, the CPU 66 stores the game program downloaded progressively from the game providing server 1, in the hard disk device 74 (S113), and when download has ended and storage to the hard disk device 74 has been completed, then it performs data setting processing relating to the various sections of the machine, in such a manner that the downloaded game can be played (S114). The CPU 66 then transfers to processing for playing the game.

Although omitted from the illustration in FIG. 12, if the "Cancel" icon on the game type selection display image is operated in the processing from step S102 onwards, then the CPU 66 returns to step S101, and if the "Cancel" icon is operated in the initial state in step S101, then the CPU 66 returns the game selection-enabled gaming machine 2 to a standby state. In the processing for returning the machine to a standby state, pay-out of the money accumulated into the machine, and the like, is implemented.

Since the selection of the denomination (unit gaming fee) has priority over the selection of the game type, it is possible to narrow down the range of selectable game types, in accordance with the selected denomination (unit gaming fee). In the case of a casino, many players give priority to the unit gaming fee, over the type of game.

The game providing server 1, on the other hand, waits for a game program download request to be sent by any one of the game selection-enabled gaming machines 2. Having received a report that a request of this kind has been issued, from the communications interface circuit 22, the CPU 10 starts the program 14*a* (see FIG. 13) for providing a game program.

Firstly, the CPU 10 recognizes the game type that the game program is requested (S201), and determines whether or not a game program of that game type can be downloaded (S202).

In order to even out the types of games that are played, it is possible, for example, to prohibit the downloading of the game program of a particular type of game if the ratio of the number of installed game selection-enabled gaming machines 2 playing that type of game exceeds 30 % (this figure may of course be set to another ratio; or it may be set to an absolute number of machines). The CPU 10 stores the number of downloads relating to respective types of game, in the hard disk device 18, for example, and if this number will exceed 30 % of the total number of installed machines when the current download is carried out, then it determines that download is not possible. Furthermore, it is also possible to set a time band, or a zone of the game selection-enabled gaming machines 2 in which download is permit, depending on the type of game, or a combination of the type of game and the denomination. Information relating to conditions of this kind is stored previously in a hard disk device 18 or RAM 16, and the CPU 10 determines that download is not possible if the type of game relating to the request, or the combination of the type of game and the denomination, do not satisfy the conditions.

If the CPU 10 determines that download is not possible at step S202, then it returns a download refusal notification to the game selection-enabled gaming machine 2 which originated the request (S203), via the communications interface circuit 22, whereupon the sequence of processing ends.

On the other hand, if the CPU 10 determines at step S202 that download is possible, then it returns an instruction to erase the storage game program, to the game selection-enabled gaming machine 2 that originated the request, via the communications interface circuit 22 (S204), whereupon the CPU 10 waits for the game selection-enabled gaming machine 2 to report that storage preparations have been completed (S205). The instruction to erase the stored game program may include the information of volume, or the like, of the game program that is to be downloaded, in such a manner that the storage capacity required for download can be ensured in the game selection-enabled gaming machine 2.

Upon receiving a completion of storage preparations report, the CPU 10 reads out the game program of the requested game type, from the hard disk device 18, and causes the game selection-enabled gaming machine 2 which originated the request to download the game program, via the communications interface circuit 22 (S206). Thereupon, when download is completed, the CPU 10 updates or adds the management information or journal in the hard disk device 18 or RAM 16 (S207), and then terminates the sequence of processing.

For example, the management information indicating which type of game program is currently downloaded in the game selection-enabled gaming machine 2 is updated, and game type management information, namely, the total number of downloads of this game type or the number of downloads of that combination of game type and denomination, is updated.

As shown in FIG. 10 described above, the main display device 32 displays a "Change game" icon 32*a* during the period that a certain game program has been selected. If it is reported to the CPU 66 from the touch panel 28 that this "Change game" icon 32*a* has been operated, then the CPU 66 executes a control processing similar to the game type selection operation from the standby state.

Furthermore, if the total number of coins (CREDIT) has become zero, and a prescribed time period has elapsed subsequently, then the CPU 66 sets the game selection-enabled gaming machine 2 to a standby state, and the display of the main display device 32 and the first to third sub display devices 34, 36 and 38 is switched to the display for a standby state.

Beneficial Effects of the Present Embodiment

According to the embodiment described above, even if a player wishes to play a game by changing the unit gaming fee, the game can be played on the same gaming machine, and the type of game can also be changed. Consequently, it is possible to increase the operating rate of the gaming machine.

Furthermore, when selecting from a plurality of types of game, since the unit gaming fee is selected firstly, and a game type is then selected from a range of game types which can be played using that unit gaming fee, then it is possible for the player to select the type of game, appropriately. If, for example, the type of game is selected firstly, then the unit gaming fees which can be set for the selected game type may be different to that desired by the player, thus making the selection operation impossible.

(B) Further Embodiments

In the description of the embodiments given above, various modifications were mentioned, but it is also possible to cite modifications of the following kind, for example.

In the aforementioned embodiment, the settable unit gaming fee matches a denomination of a coin, bill, or the like, but it is also possible to allow a unit gaming fee which does not match a denomination to be selected. For example, it is possible to accept 30 cents, 60 cents, or the like, as a unit gaming fee.

Furthermore, in the aforementioned embodiment, coins or bills are introduced into a gaming machine, but in a further method, it is also possible to incorporate a remaining amount of credit. For example, gaming media, such as gaming medals, tokens, or the like, may be introduced, or gaming balls, such as pachinko balls, may be introduced. Furthermore, it is also possible to insert, into the gaming machine, a storage medium, such as a magnetic card or IC card, which stores digitalized data relating to a number of gaming media, such as coins, in such a manner that the digitalized data is used instead of coins. Moreover, it is also possible to download this digitalized data to the gaming machine, from a server, or the like, upon authentication of the player.

Furthermore, in the aforementioned embodiment, even if the unit gaming fee is changed without changing the type of game, the unit gaming fee is changed by displaying the game type selection display screen shown in FIG. 14, but it is also possible to allow the unit gaming fee to be changed by displaying a separate display image, and moreover, it is also possible to provide a unit gaming fee changing switch and to change the unit gaming fee accepted with a selected game type, on a cyclical basis, each time the switch is operated.

In the aforementioned embodiment, the game type selection display image shown in FIG. 14 is displayed when the "Change game" icon is operated, and switching of the game type is executed, but it is also possible to permanently display the game type selection display image shown in FIG. 14 on any one of the sub display devices, in such a manner that switching of the game type or unit gaming fee can be instructed immediately.

Furthermore, in the aforementioned embodiment, it is necessary to select the unit gaming fee before selecting the type of game, but it does not matter which of the selection of the unit gaming fee or the selection of the game type comes first. If the unit gaming fee is selected first, then a similar operation to that of the aforementioned embodiment is implemented, whereas if the game type is selected first, then icons for one or a plurality of unit gaming fees which are accepted with the selected game type are displayed in a distinct manner to the icons of the unit gaming fees which are not accepted, and the unit gaming fee is then selected.

Moreover, in the aforementioned embodiment, combined information for the game types and the unit gaming fees accepted with the game types is stored in a fixed fashion in the game selection-enabled gaming machine, but it is also possible to store combined information of this kind, previously, in the game providing server, in such a manner that it is downloaded to the game selection-enabled gaming machine when it is necessary to select a game type.

Additionally, the aforementioned embodiment only relates to types of games displayed on a main display device, but it is also possible to select types of games using physical reels. For example, a liquid crystal display is used as the main scanning direction, physical reels are disposed behind this liquid crystal display, and a game screen is displayed on the full surface of the liquid crystal display in respect of types of games which do not use the physical reels, whereas the liquid crystal display section in front of the physical reels is controlled so as to assume a transparent state, in the case of types of games which use the physical reels.

The aforementioned embodiment relates to a gaming system comprising a game providing server and game selection-enabled gaming machines, but the characteristic features of the present invention may also be applied to an independent game selection-enabled gaming machine. For example, it is possible to store game programs for all of the types of games, previously, in the gaming machine, and to then copy the game program of a game type indicated by a selection operation similar to that of the aforementioned embodiment, to a storage area used for executing the game.

What is claimed is:

1. A gaming system comprising:

a plurality of game selection-enabled gaming machines which implement a game on the basis of a unit gaming fee, and allow a player to select a game type from a plurality of game types;

a game providing server which provides the gaming machines with a game program to implement a selected game type in any of the gaming machines, and a network which connects the plurality of gaming machines to the game providing server, wherein said game providing server includes, a game program memory configured to store a plurality of game programs corresponding to a plurality of types of games; and a first processor configured to permit downloading of the game program corresponding to a type of game selected in any of said game selection-enabled gaming machines, and a respective one of said gaming machines includes, a display device which displays a first icon of an unit gaming fee and a plurality of selection second icons corresponding to the plurality of selectable game types;

a touch panel associated with the display device;

a memory which stores game selection programs including table-data in which the plurality of game types are correlated with respective unit gaming fees; and a second processor which executes the game selection programs in the memory, and (A) displays, on the display device, a plurality of first icons corresponding to a plurality of unit gaming fees;

(B) receives information regarding the unit gaming fee selected through the touch panel by the player;

(C) accesses the table-data based on the received information regarding the selected unit gaming fee, and recognizes a game type which can be offered, from the plurality of game types, at the selected unit gaming fee;

(D) displays, on the display device, the selection second icons corresponding to the game types which can be offered at the selected unit gaming fee, without displaying the selection second icons corresponding to the game types which cannot be offered at the selected unit gaming fee, based on the recognized game type in processing (C); and (E) requests the game providing server for the game program for the game type corresponding to the selected selection second icon, the second selection icon being selected by the player.

2. The gaming system according to claim 1, wherein said first processor of game providing server determines whether or not conditions for permitting downloading are satisfied when a game program of a certain game type is requested by any of said game selection-enabled gaming machines.

3. The gaming system according to claim 2, wherein said first processor of game providing server determines that downloading is not permitted in cases where if the current request is accepted and the game program is downloaded then a total number of gaming machines that downloaded the game program is equal to or greater than a threshold value, or determines that downloading is not permitted in cases where a ratio of the total number of gaming machines that downloaded the game program to a total number of said plurality of gaming machines is equal to or greater than a threshold value.

4. The gaming system according to claim 1, wherein the player uses said touch panel to change the type of game displayed on said display.

5. The gaming system according to claim 1, wherein the display device displays a gaming demonstration screen thereon during a changing of the type of game.

6. The gaming system according to claim 1, wherein said network is any one of a local area network, a public telecommunication network, a dedicated circuit in which said game providing server and said gaming machines are connected in a one-to-one fashion, and a radio circuit configured to provide radio communications between said game providing server and said gaming machines.

7. A gaming system, comprising:

a plurality of game-selectable gaming machines which implement a game as the basis of an unit gaming fee and allow a player to select one game type from among a plurality of game types;

a game providing server which provides the gaming machines with a game program to implement the game type selected by any of the gaming machines; and a network which connects the plurality of the gaming machines to the game providing server, wherein the game providing server includes, a game program memory configured to store a plurality of game programs corresponding to the plurality of game types; and a first processor configured to permit downloading of the game program corresponding to a game type selected in any of the game-selectable gaming machines; and a respective one of the gaming machines includes, a display device which displays a first icon of the unit gaming fee and a plurality of selection second icons corresponding to the plurality of selectable game types;

a touch panel associated with the display device;

a memory which stores game selection programs including table-data in which the plurality of game types are correlated with respective unit gaming fees; and a second processor which executes the game selection programs stored in the memory, and (A) displays, on the display device, a plurality of first icons corresponding to a plurality of the unit gaming fees;

(B) receives information regarding the unit gaming fee selected through the touch panel by the player;

(C) accesses the table-data based on the received information regarding the unit gaming fee, and recognizes a game type which can be offered, from the plurality of game types, at the selected unit gaming fee;

(D) displays, on the display device, the selection second icons corresponding to the game types which can be offered at the selected unit gaming fee in a distinct manner from the selection icons corresponding to the game types which cannot be offered at the selected unit gaming fee, based on the recognized game type in processing (C); and (E) requests the game providing server for the game program for the game type corresponding to the selected selection icon, the second selection icon being selected by the player.

* * * * *